United States Patent
Meyer et al.

(10) Patent No.: US 11,122,137 B1
(45) Date of Patent: Sep. 14, 2021

(54) METHOD AND APPARATUS FOR ACCESSING STORED DATA USING A ROUTER FOR LARGE EVENTS

(71) Applicant: UIPCO, LLC, San Antonio, TX (US)

(72) Inventors: Gregory Brian Meyer, San Antonio, TX (US); Mark Anthony Lopez, Helotes, TX (US); Ravi Durairaj, San Antonio, TX (US); Nolan Serrao, Plano, TX (US); Victor Kwak, Frisco, TX (US); Ryan Thomas Russell, The Colony, TX (US); Christopher Russell, The Colony, TX (US); Ruthie D. Lyle, Durham, NC (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/942,850

(22) Filed: Jul. 30, 2020

Related U.S. Application Data

(60) Provisional application No. 62/880,725, filed on Jul. 31, 2019.

(51) Int. Cl.
  *G06F 15/173*   (2006.01)
  *H04L 29/08*    (2006.01)
  *H04W 24/08*    (2009.01)
(52) U.S. Cl.
  CPC .......... *H04L 67/2842* (2013.01); *H04L 67/02* (2013.01); *H04L 67/10* (2013.01); *H04W 24/08* (2013.01)

(58) Field of Classification Search
  CPC ................. H04L 67/2842; H04L 67/02
  See application file for complete search history.

(56) References Cited

U.S. PATENT DOCUMENTS

| | | | | |
|---|---|---|---|---|
| 2005/0216554 | A1* | 9/2005 | Meiman | H04L 67/1002 709/203 |
| 2010/0309819 | A1* | 12/2010 | Sanchez | H04L 41/0843 370/255 |
| 2010/0332401 | A1* | 12/2010 | Prahlad | H04L 63/0428 705/80 |
| 2012/0102009 | A1* | 4/2012 | Peterson | G06F 16/10 707/705 |
| 2012/0258708 | A1* | 10/2012 | Carter | H04W 76/40 455/427 |
| 2013/0073671 | A1* | 3/2013 | Nagpal | H04W 76/14 709/217 |

* cited by examiner

*Primary Examiner* — Hua Fan
(74) *Attorney, Agent, or Firm* — Plumsea Law Group, LLC

(57) ABSTRACT

A system and method for determining and storing website data from one or more high traffic websites in a cache using a router during an event at an event location for access by mobile computing devices is disclosed. The method may include determining one or more high traffic websites from the plurality of websites accessed by the users through the mobile computing devices at the event location, storing the website data from the one or more high traffic websites in the cache, and directing the mobile computing devices at the event location to access the website data from the cache instead of from the one or more high traffic websites to reduce a load on one or more base stations of the cellular network configured to communicate with the one or more high traffic websites.

20 Claims, 7 Drawing Sheets

METHOD AND APPARATUS FOR ACCESSING STORED DATA USING A ROUTER FOR LARGE EVENTS

CROSS-REFERENCE TO RELATED APPLICATIONS

This application claims the benefit of Provisional Patent Application No. 62/880,725 filed Jul. 31, 2019, and titled "Method and Apparatus for Accessing Stored Data Using a Router for Large Events," which is incorporated by reference herein in its entirety.

TECHNICAL FIELD

The present disclosure generally relates to methods and systems for delivering data using routers.

BACKGROUND

Events frequently attract large numbers of individuals (users) who use mobile computing devices to access websites through the Internet during an event. An example of an event is a sporting event and a sporting event is typically hosted at an event location such as a stadium, which may be outdoors or indoors. Before, during, and after a sporting event at a stadium, users may wish to access websites. For example, if the sporting event is a football game, then users may wish to access a local broadcast such as local station with local sports analysts or a national broadcast from a national broadcaster such as ESPN® who have national sports analysts. Users may also browse websites that provide update scores and news for other sporting events occurring at the same time. However, if users attempt to access high traffic websites at an event location, users may have difficulty accessing these high traffic websites due to congestion caused by a large number of users at the event attempting to access the same high traffic websites.

There is a need in the art for a system and method that addresses the shortcomings discussed above.

SUMMARY

In one aspect, a method for determining and storing website data from one or more high traffic websites in a cache during an event at an event location for access by mobile computing devices, including detecting requests for a plurality of websites from the mobile computing devices at the event location; determining one or more high traffic websites from the plurality of websites accessed by the mobile computing devices; storing website data from the one or more high traffic websites in the cache; and directing, using a router, the mobile computing devices at the event location to access the website data from the cache for the one or more high traffic websites.

In another aspect, a router for determining and storing website data from one or more high traffic websites in a cache during an event at an event location for access by mobile computing devices at the event location, including an antenna to transmit and receive website data from a cellular network; and at least one memory comprising instructions and at least one hardware processor to execute the instructions stored within the at least one memory to implement: determine one or more high traffic websites from the plurality of websites accessed by the users through the mobile computing devices at the event location, store the website data from the one or more high traffic websites in the cache, and direct the mobile computing devices at the event location to access the website data corresponding to the high traffic websites from the cache.

In another aspect, a system for locally determining and locally storing website data from one or more high traffic websites from a plurality of websites during an event at an event location, including a cache to store website data from one or more high traffic websites; a plurality of mobile computing devices positioned at the event location, which are configured to access the cache and to access the plurality of websites; and a router positioned at the event location, wherein the router determines one or more high traffic websites from the plurality of websites accessed by the mobile computing devices at the event location, stores the website data from the one or more high traffic websites in the cache, and directs the mobile computing devices at the event location to access the website data from the cache.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Embodiments provide systems, methods, and devices for determining and storing website data from high traffic websites in a memory during a large event at an event location for access by mobile computing devices by way of an event application stored on mobile computing devices. Embodiments may reduce network congestion during an event such as a football game hosted at an event location such as a stadium by predicting and/or identifying (detecting and/or determining) high traffic websites using a router, storing website data from these websites in a memory using a router, and retrieving website data from the memory using a router. An example of a memory is a cache. During an event, a user attending the event may use his or her mobile computing device to access a website. The router may store a list of high traffic websites as well as store and retrieve website data of high traffic websites from a cache. When a user requests access to one of the high traffic websites, the router may automatically retrieve the website data for the selected high traffic website from the cache and direct the website data to the mobile computing device instead of directly from a service provider hosting the high traffic website. By accessing one or more of these high traffic websites stored in the cache, the mobile computing device receives the website data from the cache instead of the service provider hosting the high traffic website by way of Internet, so that the mobile computing device can provide an audio and/or visual output to the user without delay due to the traffic congestion, which may be caused by other users attempting to access website data directly from the service providers hosting high traffic websites.

Figure 1:
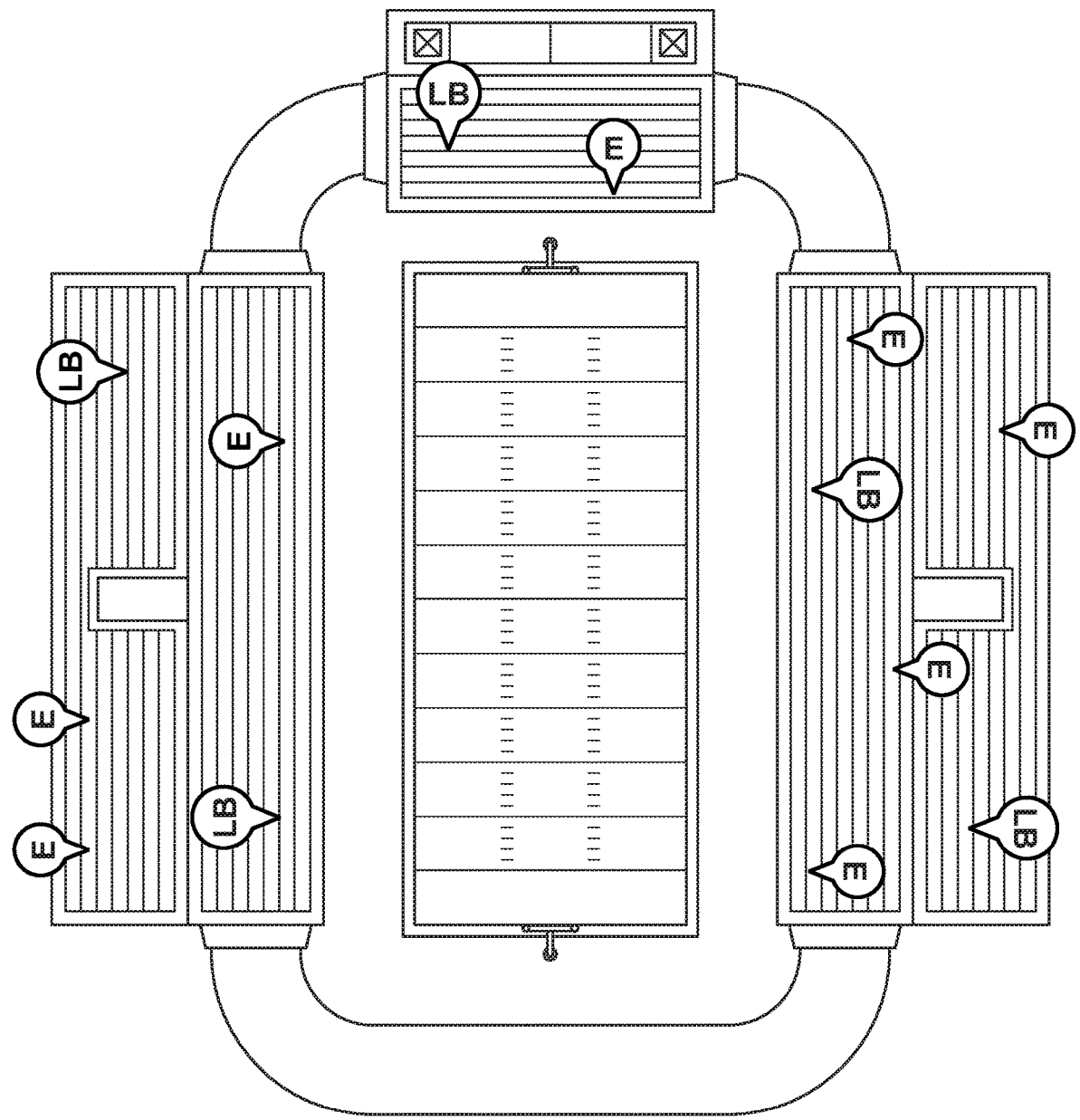
FIG. 1 is a schematic view of an event location depicting website traffic according to an embodiment.

FIG. 1 is a schematic view of an event location depicting website traffic according to an embodiment. As indicated in the example shown in FIG. 1, users, through mobile computing devices, may wish to access the Internet in order to access websites providing a local broadcast (LB) or national broadcast (E) of an event (e.g. football game) at the event location (stadium or arena). An example of a national broadcaster is ESPN®. However, because many users may be attempting to access a local broadcast website or a national broadcast website through the Internet by using a service provider hosting the website or providing access to the website, the mobile computing devices may experience delays in receiving audio/video coverage of the event due (e.g. live streaming) because the service provider or cellular network may be unable to handle the demand due to congestion. Websites providing a local broadcast (LB) of an event and a national broadcast (E) of an event are frequently high traffic websites.

Figure 2:
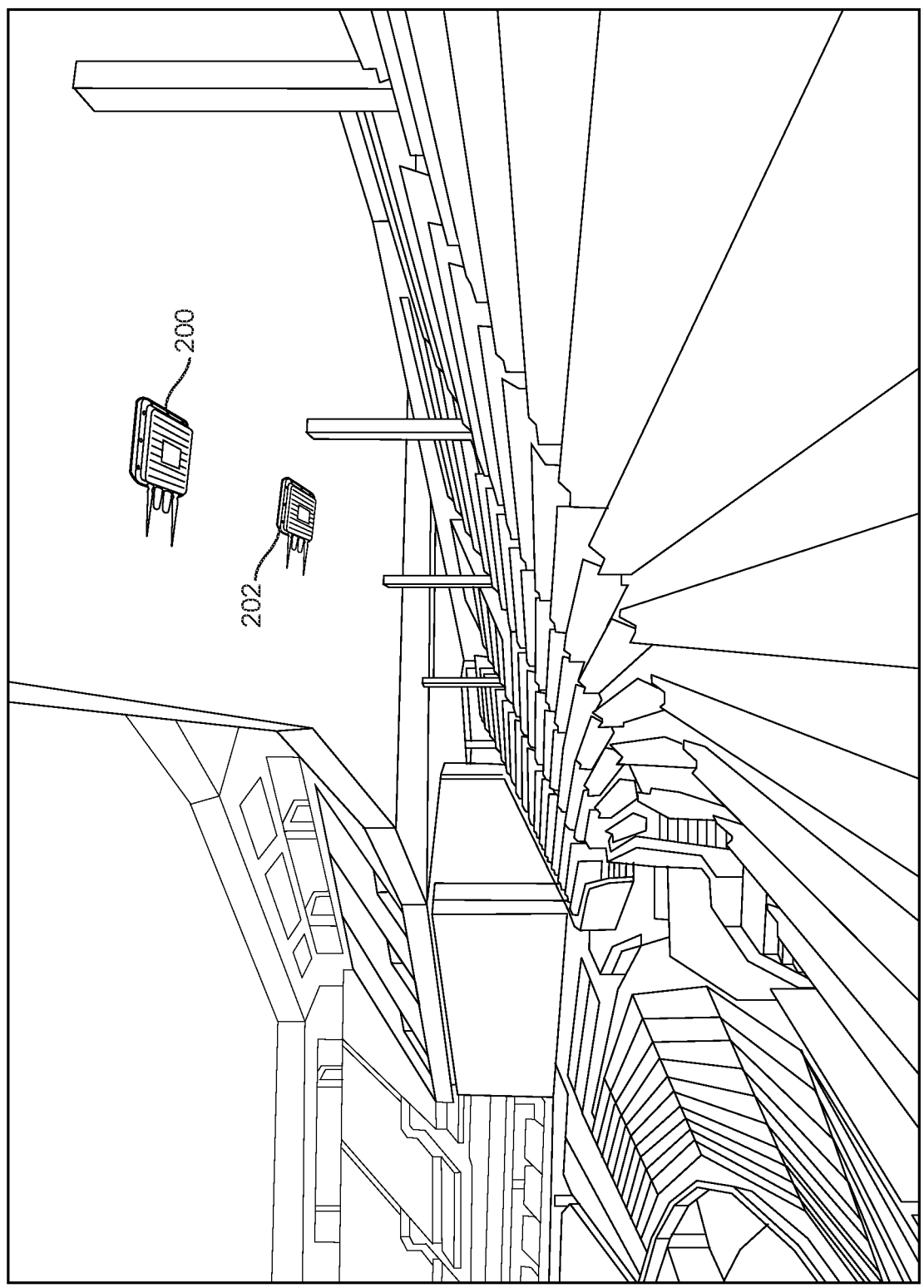
FIG. 2 is a schematic view of routers located at an event location according to an embodiment.

FIG. 2 is a schematic view of routers located at an event location according to an embodiment. As discussed above, a user may wish to access a high traffic website such as a website providing a local broadcast (LB) on a mobile computing device. However, another user may wish to access a low traffic website such as a financial website (S) for trading stocks on a mobile computing device. The financial website may be a low traffic website since the stock market is probably closed during a football game. Further, another user may wish to access a website which may be high traffic or low traffic such as a weather website (W) on a mobile computing device. For example, if the weather is sunny with no clouds in the sky, the weather website (W) may experience low traffic. However, if the sky is overcast, the weather website (W) may become a high traffic website. A router 200 and a router 202 as shown in FIG. 2 store a list of high traffic websites and interfaces with the mobile computing devices at the event through a local wireless network (e.g. local WIFI network), which can be accessed through the mobile computing device in the usual manner. When a user through a mobile computing device requests a high traffic website, the router 200 storing the high traffic website list can access the cache if the requested website is stored in the cache. Alternatively, when a user through a mobile computing device requests a low traffic website which is not listed on the high traffic website list stored in the router 200, then the mobile computing device will be directed to retrieve the website data from the cellular network through the Internet.

Figure 3:
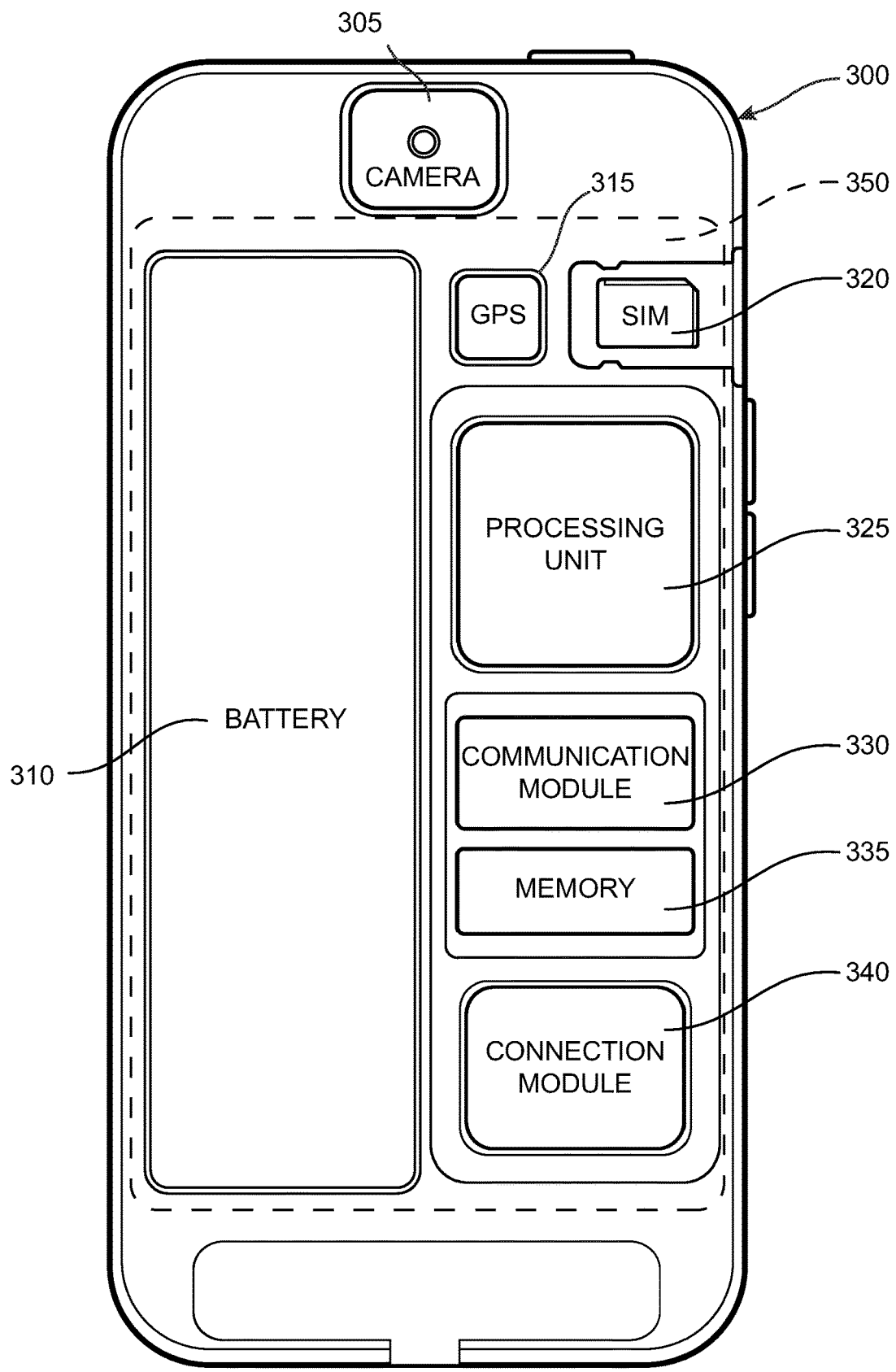
FIG. 3 is a schematic view of an embodiment of a mobile computing device.

FIG. 3 is a schematic view of an embodiment of a mobile computing device. Although the mobile computing device 300 in FIG. 3 is shown as a smart phone, examples of mobile computing devices include a smartphone, a tablet, a smartwatch, a smart glass, a smart helmet, and a laptop. Although embodiments refer to the use of mobile computing devices, any computing device may run software applications in embodiments.

As shown in FIG. 3, a mobile computing device 300 may include a camera 305, a battery 310, a global positioning system 315, a subscriber identity module (SIM) 320, a processing unit 325, a communication module 330, a memory 335, and a connection module 340. A display of the mobile computing device 300 is shown by a dotted line. The communication module 330 may include a cellular network module, a WIFI module, a personal area network (PAN) module, a near field communication (NFC) module, and a Bluetooth module. Any type of wireless or wired communication technology may be used to couple the mobile computing device 300 to a cellular network or a local network such as a local wireless network. For example, the connection module 340 may provide a wired connection to power, another device, or another system.

Figure 4:
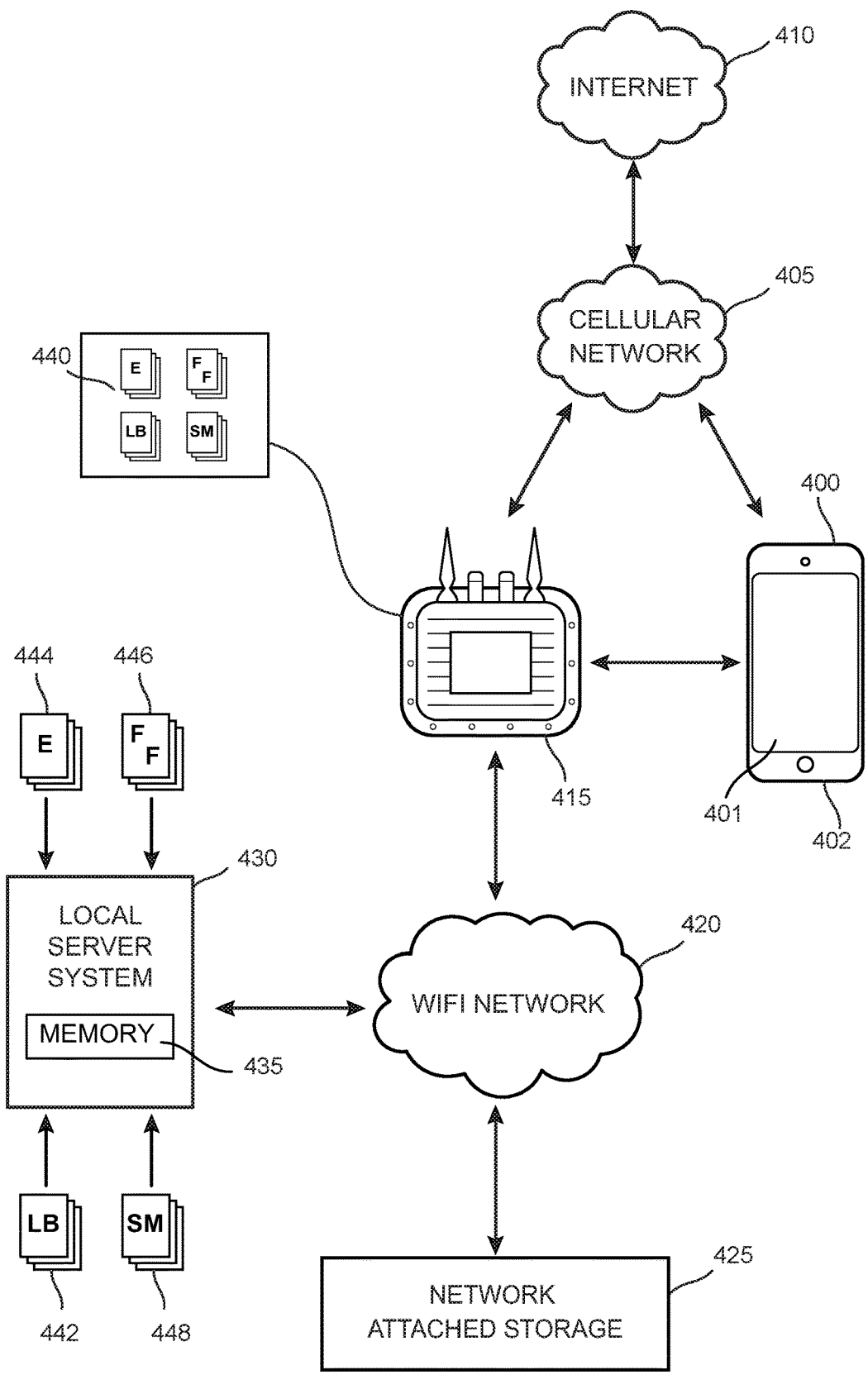
FIG. 4 is a schematic view of an embodiment of a mobile computing device and a router interfacing with a cellular network or local wireless network to access a local server system or the Internet.

FIG. 4 is a schematic view of an embodiment of a mobile computing device 400, which is an example of a mobile computing device 300 shown in FIG. 3, and a router interfacing with a cellular network or local wireless network to access a local server system or the Internet. The mobile communication device 400 includes a display 401 and also includes an audio input and audio output 402 such as a microphone and a speaker. The mobile computing device 400 interfaces with a cellular network 405 coupled to the Internet 410 as well as a router 415, which may also access the Internet 410 through the cellular network 405. Alternatively, router 415 may access the Internet 410 through an ethernet connection or through other communication devices. The router 415 may include a cache. The router 415 is also coupled to a local wireless network such as the local WIFI network 420 shown in FIG. 4. In some embodiments, a mobile computing device 400 may be required to join WIFI network 420, because WIFI network 420 is coupled to the router 415, so that the flow of website data may be controlled using the router 415.

The WIFI network 420 is coupled to a network attached storage 425, which may include a cache as well as a local server system 430, which includes a memory 435. The local server system 430 may be a cloud computing system. The memory 435 may be one or more memories and at least one of these memories may be a cache. The cache, which may be in the router 415, the network attached storage 425, or the local server system 430 may include website data from high traffic websites. A list of high traffic websites 440 may be stored in router 415. Examples of high traffic websites may include websites for a local broadcast (LB) 452, a national broadcast (E) (e.g. ESPN®) 444, fantasy football (FF) 446, and social media (SM) 448. An example of a low traffic website may be a financial website (not shown). An example of website which may be a high traffic website or a low traffic website is a weather website (not shown). The processes will be discussed in greater detail below with respect to the flow charts in FIGS. 5 and 6.

Figure 5:
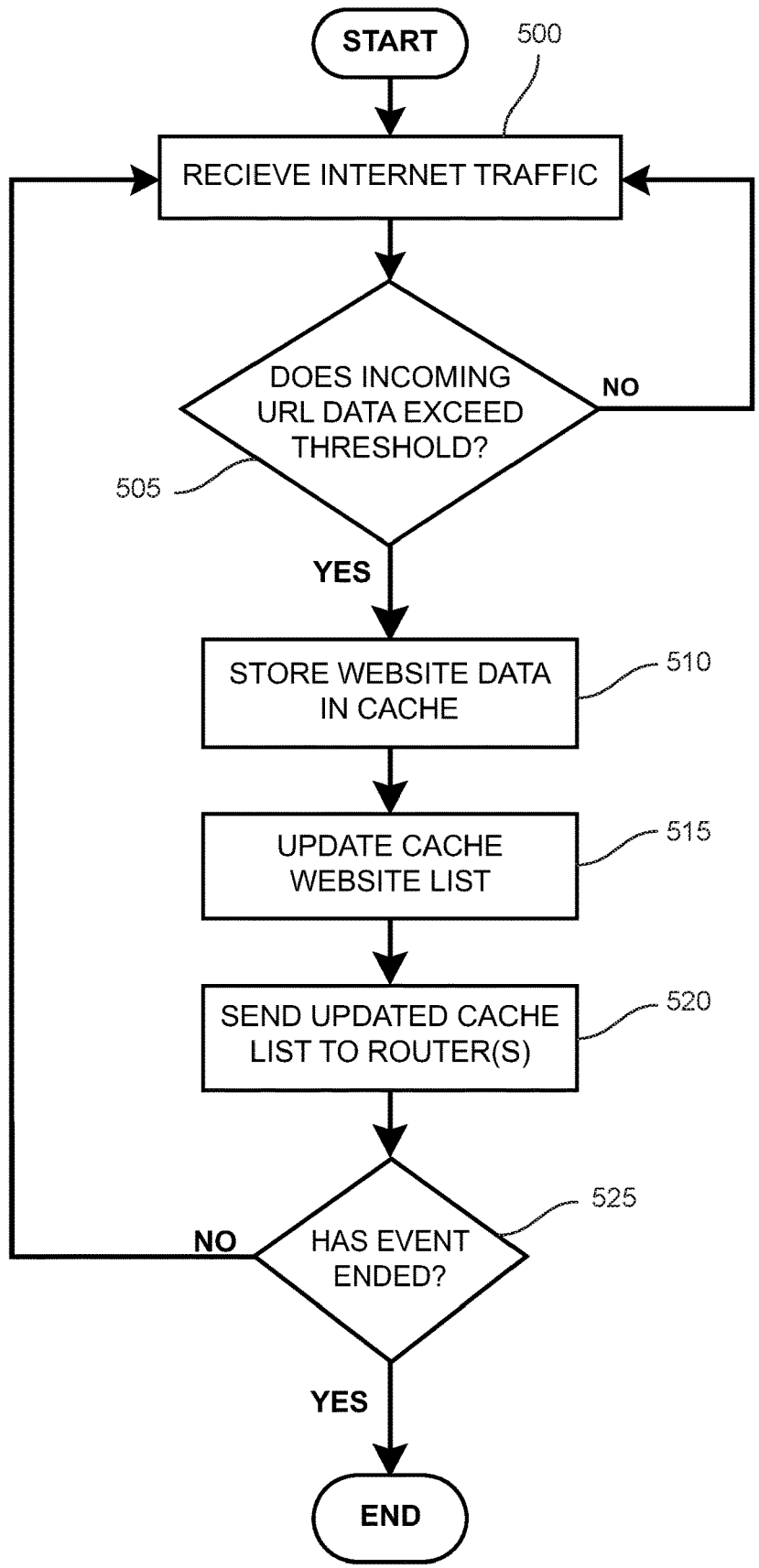
FIG. 5 is a schematic view of an embodiment of a process for storing high traffic websites using a router.

FIG. 5 is a schematic view of an embodiment of a process for storing high traffic websites using a router 415. In operation 500, a router 415 may monitor and/or receive internet traffic from the cellular network 405 which is coupled to the Internet 410. In an embodiment, cellular network 405 includes base stations, and one or more base stations are located at or near the event location. The one or more base stations and one or more routers 415 can detect websites requested by users of mobile computing devices 400. These websites have uniform resource locators (URLs), which may provide access to website data hosted by a service provider. Website data for each URL may also include the URL itself. In an embodiment, the router 415 for example may receive information regarding the amount of internet traffic from one or more base stations as well as one or more routers 415 (operation 500). The router 415 may determine high traffic websites including website data from the one or more websites detected at the one or more base stations and at the one or more routers 415, which is based on a number of mobile computing devices 400 requesting access to the detected websites through the one or more base stations. For example, if a URL demanded by users from a website exceeds a predetermined threshold (for example, a maximum number of users), then the website data corresponding to the URL is stored in a cache (operation 505 and 510). Alternatively, if the URL demanded by users from a website does not exceed the predetermined threshold, then the website data corresponding to this website is not stored in a cache (operation 505) and the operation moves to operation 500 so that internet traffic continues to be received and monitored. In addition, in an alternative embodiment, the router 415 may also be directed to continuously store website data from certain predetermined high traffic websites regardless of whether the incoming requests for a URL exceeds a threshold.

In an alternative embodiment, the local server system 430 may receive information regarding the amount of internet traffic from one or more base stations as well as one or more routers 415 (operation 500). The local server system 430 may determine high traffic websites including website data from the one or more websites detected at the one or more base stations and at the one or more routers 415, which is based on a number of mobile computing devices 400 requesting access to the detected websites through the one or more base stations. For example, if a URL demanded by users from a website exceeds a predetermined threshold, then the website data corresponding to the URL is stored in a cache (operation 505 and 510) using router 415. Alternatively, if the URL demanded by users from a website does not exceed the predetermined threshold, then the website data corresponding to this website is not stored in a cache (operation 505) and the operation moves to operation 500 so that internet traffic continues to be received and monitored.

After the website data corresponding to a detected high traffic website is stored (operation 510), the high traffic website list (cache list) is updated to include the new high traffic website where the incoming URL data has exceeded the threshold (operation 515). The high traffic website list includes a list of URLs for the high traffic websites (high traffic URLs), which were identified in operation 505, and includes a local URL corresponding to each high traffic URL hosted by a service provider. In operation 620, the updated cache list is transmitted to all routers 415 at the event location (operation 520). If the event has not yet ended at the event location, the router 415 continues to receive and monitor internet traffic (operations 525 and 500). However, if the event ends in this embodiment, then the router 415 and/or local server system 430 no longer determines whether incoming URL data exceeds a threshold and the process ends (operation 525).

Figure 6:
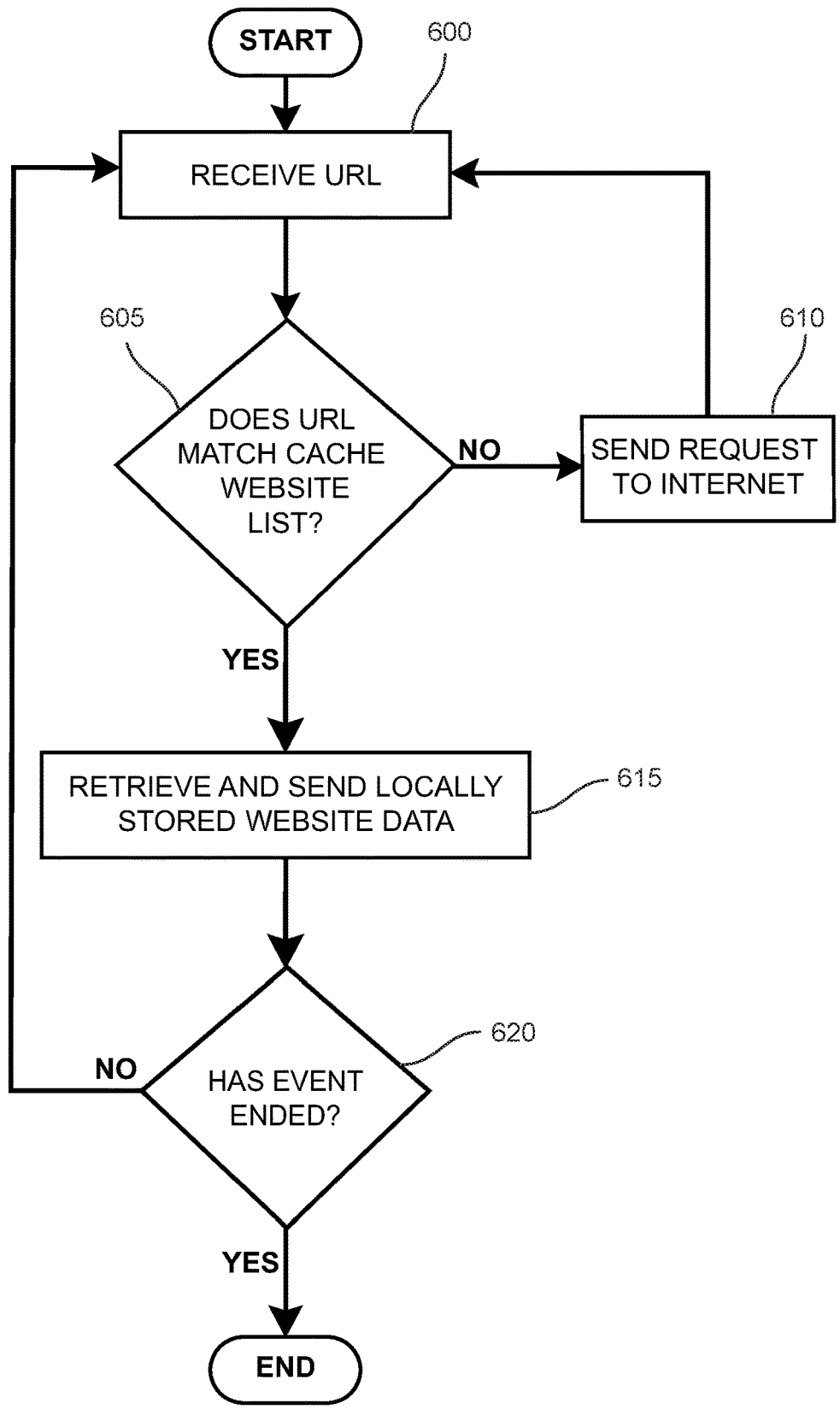
FIG. 6 is a schematic view of an embodiment of a process of retrieving high traffic websites using a router.

FIG. 6 is a schematic view of an embodiment of a process of retrieving high traffic websites using a router 415. In an embodiment, the mobile computing device 400 may have accessed the local WIFI network 420 through router 415 in an ordinary manner. Once the router 415 receives a URL from a mobile computing device 400 (operation 600), the process determines whether the received URL matches one of the URLS in the URL cache website list (high traffic website list) (operation 605). If the received URL is not on the high traffic website list (no match), then the request may be sent to the Internet (operation 605 and 610), and the process awaits receipt of the next URL (operation 600). If the router 415 determines that the received URL is on the high traffic website list (match), then the router 415 retrieves the website data of the selected high traffic website from the cache and sends the website data to the mobile computing device 400 (operation 615). If the event has not yet ended at the event location, the router 400 continues to receive and monitor internet traffic (operations 620 and 600). However, if the event ends in this embodiment, then the router 415 no longer receives URLS and the process ends (operation 620).

Embodiments may include provisions for predictive caching. In some embodiments, a system can provide predictive caching based on data usage generated at an event with differential local caching of high use static data. In some cases, latency retention may also be used as part of the predictive caching algorithm. In some cases, the system would be an adaptive model that operated on streaming data with actions of latency need and concurrent URL requests caching within specific or even groups of routers covering the event.

As one example, a company could have a block of seats at a game and the nearest router's predictive algorithm may recognize that those users are primarily using a single slack channel when they are online. The system could then cache data for the slack channel for latency of at least the last five minutes. In a different part of the stadium a large fan group may be using social media to post and share videos associated with the game. The routers near these users would provide longer latency, including an hour of a data from a video sharing website to keep up with constant sharing of content and viral spikes of particular videos.

Figure 7:
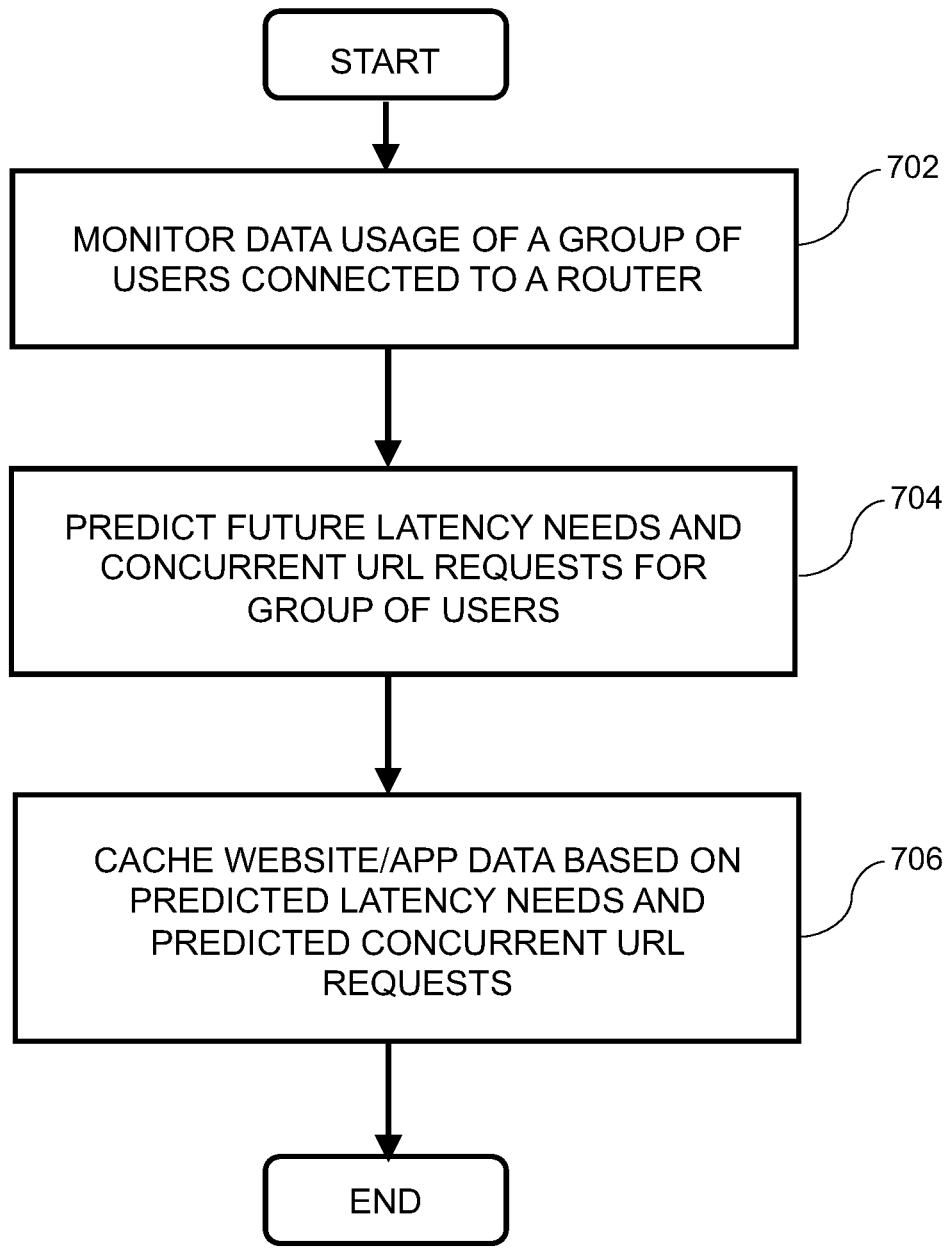
FIG. 7 is a schematic view of a process for predictive caching, according to an embodiment.

FIG. 7 is a schematic view of a process for predictive caching. Starting in step 702, the system may monitor the data usage of a group of users connected to a router. For example, the group of users could be a group of fans in a particular section of a stadium at a sporting event or musical concert. Next, in step 704, the system predicts future latency needs and concurrent URL requests for the group of users. Specifically, based on monitoring the users' data in step 702, the system can determine the sites and/or apps requesting the most data for those specific users, and make predictions about the type of latency needed and the number of concurrent URL requests needed for each site/app. Then in step 706, the system can cache website and/or app data based on the predicted latency needs and the predicted concurrent URL requests. This allows the system to deliver content to the targeted users based on their predicted needs. Moreover, this targeted approach can be applied differentially across a venue (such as a stadium) so that different routers cache different website/app data with different latency/concurrent request constraints according to the needs of users connected to each router.

In some embodiments, predictive caching could be done using one or more machine learning models. Exemplary models that could be used include supervised learning models, unsupervised learning models, and reinforcement learning models. Models could be trained on previous data provided by various venues to determine appropriate settings for latency and concurrency, as well as for other features that may be optimized.

It may be appreciated that the above systems and methods may apply not only to sporting events such as football games but may also apply to any event such as concerts, plays, or fairs.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for determining and storing website data from one or more high traffic websites in a cache during an event at an event location for access by mobile computing devices, comprising:

detecting requests for a plurality of websites from a first group of users of the mobile computing devices at the event location, wherein the first group of users are located in a first area at the event location;

determining one or more high traffic websites from the plurality of websites requested by the first group of users of the mobile computing devices;

wherein determining the one or more high traffic websites includes:

(1) comparing a number of the mobile computing devices that are requesting a particular website of the plurality of websites during the event to a predetermined threshold; and (2) when the number of the mobile computing devices that are requesting the particular website exceeds the predetermined threshold, storing a uniform resource locator (URL) corresponding to the particular website to a list of the one or more high traffic websites stored in the cache of a first router associated with the first area at the event location;

storing website data from the one or more high traffic websites in the cache; and directing, using the first router, the mobile computing devices of the first group of users in the first area at the event location to access the website data from the cache for the one or more high traffic websites;

wherein a second router associated with a second area at the event location that is different from the first area includes a cache having a different list of high traffic websites than the list stored in the cache of the first router.

2. The method according to claim 1, wherein one of the mobile computing devices comprises one of a smartphone, a tablet, a smartwatch, a smart glass, a smart helmet, and a laptop.

3. The method according to claim 1, wherein the first router detects the plurality of websites accessed by the first group of users of the mobile computing devices.

4. The method according to claim 1, wherein the first router determines the one or more high traffic websites from the plurality of websites accessed by the mobile computing devices of the first group of users in the first area at the event location.

5. The method according to claim 1, wherein the first router accesses the cache to store the one or more high traffic websites in the cache.

6. The method of claim 1, wherein the first group of users in the first area at the event location are connected to the first router; and wherein a second group of users in the second area at the event location are connected to the second router.

7. The method of claim 1, wherein one or more base stations of a cellular network are located at or near the event location to receive website data from one or more cloud computing systems, and the first router determines whether website data requested by the first group of users through the mobile computing devices is retrieved from the cache or from the one or more base stations communicating with the one or more cloud computing systems.

8. The method of claim 1, wherein the first area and the second area at the event location are different sections of a stadium.

9. The method of claim 1, wherein the first router is coupled to network attached storage which includes the cache.

10. The method of claim 1, wherein the first router is coupled to a server which includes the cache, and wherein the first router and the server determine the one or more high traffic websites from the plurality of websites accessed by the first group of users of the mobile computing devices at the event location.

11. The method of claim 1, wherein the method further includes predicting a number of concurrent URL requests for the one or more high traffic websites; and wherein storing website data further includes storing data according to the predicted number of concurrent URL requests for the one or more high traffic websites.

12. A router for determining and storing website data from one or more high traffic websites in a cache during an event at an event location for access by users through mobile computing devices at the event location, comprising:

an antenna to transmit and receive website data from a cellular network; and at least one memory comprising instructions and at least one hardware processor to execute the instructions stored within the at least one memory to implement:

determine one or more high traffic websites from a plurality of websites requested by a first group of the users through the mobile computing devices at the event location, wherein the first group of users are located in a first area at the event location and wherein the router is associated with the first area, wherein the one or more high traffic websites are determined by:

(1) comparing a number of the mobile computing devices of the first group of users that are requesting a particular website of the plurality of websites during the event to a predetermined threshold; and (2) when the number of the mobile computing devices that are requesting the particular website exceeds the predetermined threshold, storing a uniform resource locator (URL) corresponding to the particular website to a list of the one or more high traffic websites stored in the cache;

store the website data from the one or more high traffic websites in the cache, and direct the mobile computing devices of the first group of users in the first area at the event location to access the website data corresponding to the one or more high traffic websites from the cache; and wherein a different router associated with a second area at the event location that is different from the first area includes a cache having a different list of high traffic websites than the list stored in the cache of the router associated with the first area.

13. The method of claim 12, wherein one of the mobile computing devices comprises one of a smartphone, a tablet, a smartwatch, a smart glass, a smart helmet, and a laptop.

14. The method of claim 12, wherein one or more base stations of a cellular network are located at or near the event location to receive website data from one or more cloud computing systems, and the router determines whether website data requested by the first group of users through the mobile computing devices is retrieved from the cache or from the one or more base stations communicating with the one or more cloud computing systems.

15. The method of claim 12, wherein the at least one memory is the cache.

16. The method of claim 12, wherein the router is coupled to network attached storage which includes the cache.

17. The method of claim 12, wherein the router is coupled to a server which includes the cache through a local wireless network, and wherein the router and the server determine the one or more high traffic websites from the plurality of websites accessed by the mobile computing devices of the first group of users in the first area at the event location.

18. A system for locally determining and locally storing website data from one or more high traffic websites from a plurality of websites during an event at an event location, comprising:

a cache to store website data from one or more high traffic websites;

a plurality of mobile computing devices positioned at the event location, the plurality of mobile computing devices including mobile computing devices of a first group of users located in a first area at the event location and mobile computing devices of a second group of users located in a second area at the event location that is different from the first area, the plurality of mobile computing devices being configured to access the cache and to access the plurality of websites;

a first router positioned at the first area at the event location, the mobile computing devices of the first group of users being connected to the first router, wherein the first router:
determines the one or more high traffic websites from the plurality of websites accessed by the mobile computing devices of the first group of users in the first area at the event location,
wherein the one or more high traffic websites are determined by:
(1) comparing a number of the mobile computing devices of the first group of users that are requesting a particular website of the plurality of websites during the event to a predetermined threshold; and
(2) when the number of the mobile computing devices of the first group of users that are requesting the particular website exceeds the predetermined threshold, storing a uniform resource locator (URL) corresponding to the particular website to a list of the one or more high traffic websites stored in the cache associated with the first router;
stores the website data from the one or more high traffic websites in the cache associated with the first router, and
directs the mobile computing devices of the first group of users in the first area at the event location to access the website data corresponding to the one or more high traffic websites from the cache associated with the first router; and
a second router positioned at a second area at the event location that is different from the first area, the second router including a cache having a different list of high traffic websites than the list stored in the cache associated with the first router.

19. The system of claim 18, wherein one of the mobile computing devices comprises one of a smartphone, a tablet, a smartwatch, a smart glass, a smart helmet, and a laptop.

20. The system of claim 18, wherein the one or more high traffic websites are managed by one or more cloud computing systems.

* * * * *